(12) United States Patent
Matsumoto et al.

(10) Patent No.: US 8,241,804 B1
(45) Date of Patent: Aug. 14, 2012

(54) METHOD FOR CONTROLLING FUEL CELL SYSTEM

(75) Inventors: Yuji Matsumoto, Wako (JP); Koichiro Miyata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/405,361

(22) Filed: Feb. 27, 2012

(30) Foreign Application Priority Data

Mar. 4, 2011 (JP) .................................. 2011-048006

(51) Int. Cl.
*H01M 8/04* (2006.01)

(52) U.S. Cl. ........................................ 429/429; 429/444

(58) Field of Classification Search ........................ None
See application file for complete search history.

(56) References Cited

U.S. PATENT DOCUMENTS

| 8,101,309 | B2 * | 1/2012 | Morikawa et al. | 429/429 |
| 2005/0074641 | A1 * | 4/2005 | Inai et al. | 429/13 |
| 2006/0159966 | A1 * | 7/2006 | Wake et al. | 429/13 |
| 2010/0209793 | A1 * | 8/2010 | Kamiyama et al. | 429/429 |

FOREIGN PATENT DOCUMENTS

JP 2004-022487 1/2004

* cited by examiner

*Primary Examiner* — John S Maples
(74) *Attorney, Agent, or Firm* — Ditthavong Mori & Steiner, P.C.

(57) ABSTRACT

A method includes determining, if an instruction to stop a operation of a fuel cell is detected, whether an in-stop-mode power generating process has been executed, a fuel gas being to be stopped and an oxide gas being to be supplied to the fuel cell to generate power from the oxide-gas supply apparatus in the in-stop-mode power generating process, and shortening a time for a diluting process to be executed by a scavenging apparatus when it is determined that the in-stop-mode power generating process has been executed, as compared with a case where it is determined that the in-stop-mode power generating process has not been executed.

7 Claims, 8 Drawing Sheets

METHOD FOR CONTROLLING FUEL CELL SYSTEM

CROSS-REFERENCE TO RELATED APPLICATIONS

The present application claims priority under 35 U.S.C. §119 to Japanese Patent Application No. 2011-048006, filed Mar. 4, 2011, entitled "Control Method For Fuel Cell System." The contents of this application are incorporated herein by reference in their entirety.

BACKGROUND OF THE INVENTION

1. Field of the Invention

The present disclosure relates to a method for controlling a fuel cell system.

2. Discussion of the Background

A fuel cell system acquires DC electric energy according to an electrochemical reaction of a fuel gas (gas essentially containing hydrogen, such as hydrogen gas) and an oxide gas (gas essentially containing oxygen, such as air) respectively supplied to an anode electrode and a cathode electrode. This system is of a stationary type, or is mounted in a fuel cell vehicle as an on-vehicle fuel cell system.

For example, a solid polymer fuel cell has an electrolyte membrane/electrode assembly (MEA) having an anode electrode and a cathode electrode provided on the respective side of an electrolyte membrane formed by a polymer ion-exchange film; the electrolyte membrane/electrode assembly is sandwiched by a pair of separators. A fuel gas passage for supplying a fuel gas to the anode electrode is formed between one of the separators and the electrolyte membrane/electrode assembly. An oxide gas passage for supplying an oxide gas to the cathode electrode is formed between the other separator and the electrolyte membrane/electrode assembly.

When the fuel cell is stopped, supply of the fuel gas and oxide gas is stopped. However, the fuel gas remains in the fuel gas passage, and the oxide gas remains in the oxide gas passage. When the operation-stop period of the fuel cell becomes long, therefore, the fuel gas and the oxide gas may pass through the electrolyte membrane, so that the fuel gas is mixed with the oxide gas to react therewith, thereby deteriorating the electrolyte membrane/electrode assembly.

To cope with the problem, a fuel cell system disclosed in, for example, Japanese Unexamined Patent Application Publication No. 2004-22487 (FIG. 1 and paragraph [00029]) shuts off the supply of a reaction gas to the anode side, and shuts off the supply of the reaction gas to the cathode side when the operation of the fuel cell is stopped. Further, the exhaust gas on the anode side is circulated to the upstream side through an anode-side circulation line, and the exhaust gas on the cathode side is circulated to the upstream side through a cathode-side circulation line, so that an electrochemical reaction in the fuel cell is maintained to generate power, thereby charging the battery with the generated power. Hydrogen in the exhaust gas on the anode side is consumed and oxygen in the exhaust gas on the cathode side is consumed this way, and a nitrogen gas is stored in a tank. The gases in the anode and cathode of the fuel cell are replaced with the nitrogen gas stored in the tank.

SUMMARY OF THE INVENTION

According to one aspect of the present invention, a method is for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, a fuel-gas supply apparatus to supply the fuel gas to the fuel cell, and a scavenging apparatus to execute a diluting process of diluting a concentration of the fuel gas in the anode of the fuel cell, the scavenging apparatus being to supply a scavenging gas into the anode for scavenging when an outside temperature is equal to or lower than a predetermined temperature at a time of stopping an operation of the fuel cell. The method includes: determining, if an instruction to stop the operation of the fuel cell is detected, whether an in-stop-mode power generating process has been executed, the fuel gas being to be stopped and the oxide gas being to be supplied to the fuel cell to generate power from the oxide-gas supply apparatus in the in-stop-mode power generating process; and shortening a time for the diluting process to be executed by the scavenging apparatus when it is determined that the in-stop-mode power generating process has been executed, as compared with a case where it is determined that the in-stop-mode power generating process has not been executed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
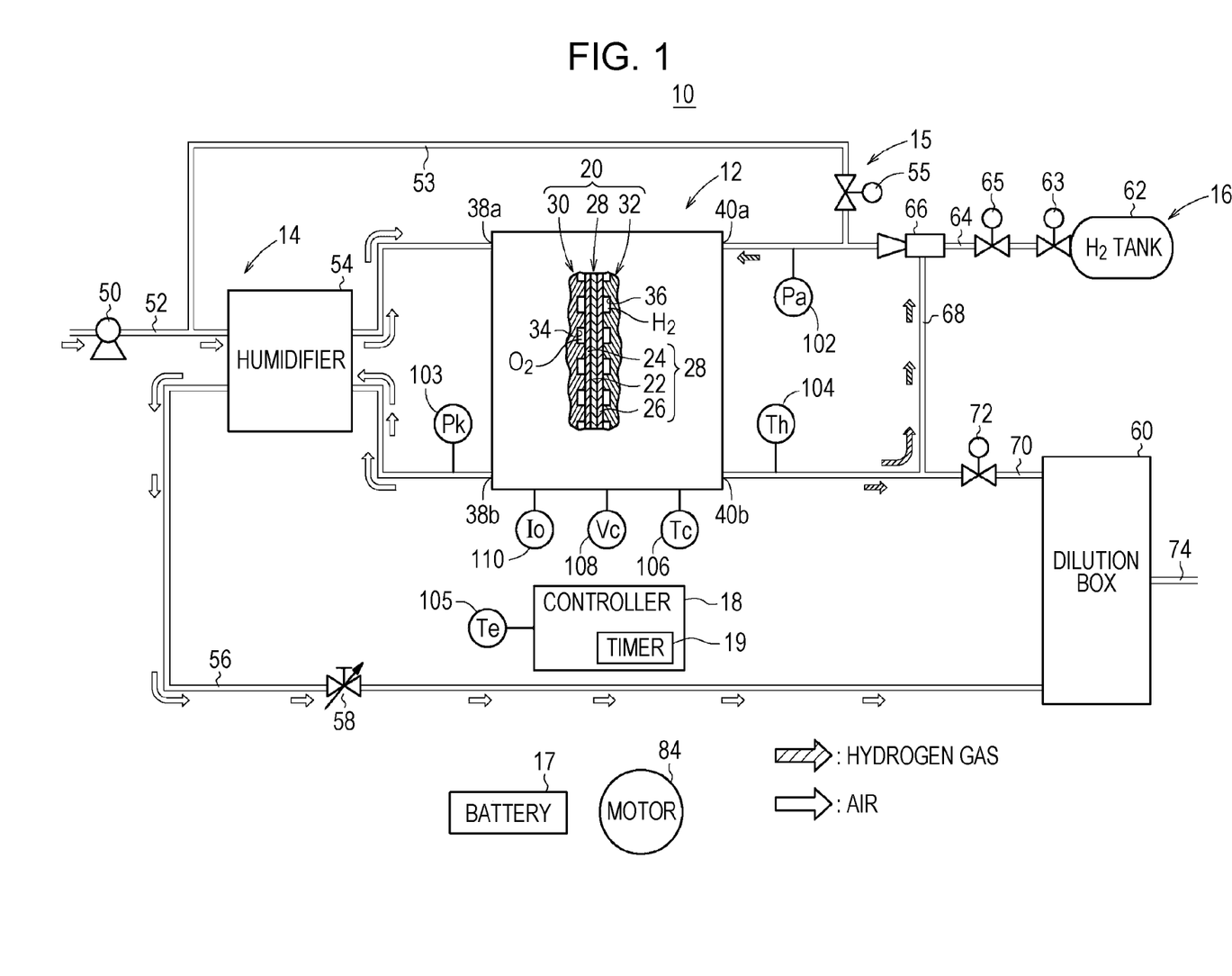
FIG. 1 is a schematic configurational diagram of a fuel cell system which is a target of a control method according to an exemplary embodiment of the disclosure.

As shown in FIG. 1, a fuel cell system 10 which is a target of a control method according to an exemplary embodiment of the disclosure includes a fuel cell stack 12, an oxide-gas supply apparatus 14 that supplies an oxide gas to the fuel cell stack 12, a scavenging apparatus 15 that supplies a replacement gas to the fuel cell stack 12, a fuel-gas supply apparatus 16 that supplies a fuel gas to the fuel cell stack 12, a battery (electric storage device) 17 connectable to the fuel cell stack 12, and a controller (control apparatus, control unit) 18 that performs the general control of the fuel cell system 10.

The controller 18 is a computer including a microcomputer, and has a CPU (Central Processing Unit), a ROM (including EEPROM) as a memory, a RAM (Random Access Memory), input/output units, such as an A/D converter and a D/A converter, and a timer 19 serving as a clock or time-measuring unit. When the CPU reads a program stored in the ROM and executes it, the controller 18 functions as various functional parts, such as a control unit, an arithmetic operation unit, and a processing unit.

The fuel cell system 10 is mounted in a fuel cell vehicle like a fuel cell car. The battery 17 permits the fuel cell vehicle to run normally, and has a capacity of 20 A and as high as about 500 V, a higher voltage and higher capacity than a 12-V power supply 98 to be described later.

The fuel cell stack 12 has a stack of a plurality of fuel cells (also called "cells" or "cell pairs") 20. Each fuel cell 20 includes an electrolyte membrane/electrode assembly (MEA) 28 which has a solid polymer electrolyte membrane 22 sandwiched between a cathode electrode 24 and an anode electrode 26. The solid polymer electrolyte membrane 22 is formed by a thin film of perfluorosulfone impregnated with water.

The cathode electrode 24 and the anode electrode 26 each have a gas diffusion layer formed by carbon paper or the like, and an electrode catalyst layer formed by applying porous carbon particles each carrying a platinum alloy (or Ru or the like) on its surface to the surface of the gas diffusion layer uniformly. The electrode catalyst layer is formed on both sides of the solid polymer electrolyte membrane 22.

The electrolyte membrane/electrode assembly 28 is sandwiched by a cathode-side separator 30 and an anode-side separator 32. The cathode-side separator 30 and anode-side separator 32 are made of, for example, carbon or a metal. An oxide gas passage 34 is provided between the cathode-side separator 30 and the electrolyte membrane/electrode assembly 28. A fuel gas passage 36 is provided between the anode-side separator 32 and the electrolyte membrane/electrode assembly 28.

The fuel cell stack 12 provided with an oxide-gas inlet hole 38a for supplying an oxide gas, e.g., an oxygen-containing gas (hereinafter also referred to as "air"), a fuel-gas inlet hole 40a for supplying a fuel gas, e.g., a hydrogen-containing gas (hereinafter also referred to as "hydrogen gas"), a coolant inlet hole (not shown) for supplying a coolant, an oxide-gas outlet hole 38b for discharging the oxide gas, a fuel-gas outlet hole 40b for discharging the fuel gas, and a coolant outlet hole (not shown) for discharging the coolant. The oxide-gas inlet hole 38a, the fuel-gas inlet hole 40a, the coolant inlet hole, the oxide-gas outlet hole 38b, the fuel-gas outlet hole 40b, and the coolant outlet hole communicate with one another in the stack direction of the fuel cells 20.

The oxide-gas supply apparatus 14 includes an air pump 50 that compresses atmospheric air and supplies it. The air pump 50 is disposed in an air supply passage 52. A humidifier 54 that exchanges moisture and heat between a supplied gas and an exhaust gas is disposed in the air supply passage 52. The air supply passage 52 communicates with the oxide-gas inlet hole 38a of the fuel cell stack 12.

The oxide-gas supply apparatus 14 further includes an air discharge passage 56 communicating with the oxide-gas outlet hole 38b. The air discharge passage 56 communicates with the a humidifying-medium passage (not shown) of the humidifier 54. The air discharge passage 56 is provided with a back-pressure control valve (hereinafter also referred to simple as "back pressure valve") 58 whose degree of opening is adjustable, such as a butterfly valve, to adjust the pressure of air supplied to the fuel cell stack 12 from the air pump 50 via the air supply passage 52. The back-pressure control valve 58 is preferably a normally-closed control valve (which is closed when not energized). The air discharge passage 56 communicates with a dilution box 60.

The scavenging apparatus 15 shares the air pump 50, which compresses and supplies atmospheric air, the air supply passage 52 and the air discharge passage 56 with the oxide-gas supply apparatus 14. The scavenging apparatus 15 further includes an air inlet passage 53 provided between a hydrogen supply passage 64 downstream of an ejector 66 and the air supply passage 52, and an air inlet valve 55 disposed in the air inlet passage 53.

The air inlet valve 55 is an on-off valve which is opened at the time of what is called an anode-side air scavenging process or the like in order to supply compressed air from the air pump 50 to the fuel gas passage 36 through the fuel-gas inlet hole 40a via the air supply passage 52 and the air inlet passage 53. The anode-side air scavenging process differs from the anode-side air replacing process in that it involves a large airflow rate enough to blow out water droplets, and is common to the anode-side air replacing process in that the fuel gas on the anode side is replaced with air.

The fuel-gas supply apparatus 16 includes a hydrogen tank 62 that stores high-pressure hydrogen and is integrally provided with an in-tank solenoid valve 63 which is an on-off valve. The hydrogen tank 62 communicates with the fuel-gas inlet hole 40a of the fuel cell stack 12 via the hydrogen supply passage 64.

The hydrogen supply passage 64 is provided with a shutoff valve 65 which is an on-off valve, and the ejector 66. The ejector 66 supplies the hydrogen gas supplied from the hydrogen tank 62 to the fuel cell stack 12 through the hydrogen supply passage 64, and sucks an exhaust gas containing an unused hydrogen gas, which has not been used in the fuel cell stack 12, from a hydrogen circulation path 68 and supplies the exhaust gas to the fuel cell stack 12 again as a fuel gas.

An off-gas passage 70 communicates with the fuel-gas outlet hole 40b. The hydrogen circulation path 68 communicates with a halfway portion of the off-gas passage 70, which is connected with the dilution box 60 via a purge valve 72. The outlet side of the dilution box 60 is connected with a discharge passage 74. The discharge passage 74 is provided with a storage buffer (not shown) to which an exhaust passage communicating with the atmosphere is connected.

The controller 18 acquires signals from a pressure sensor 102 provided in the hydrogen supply passage 64, a pressure sensor 103 provided in the vicinity of the oxide-gas outlet hole 38b, a temperature sensor 104 provided in the vicinity of the fuel-gas outlet hole 40b, an outside temperature sensor 105, a temperature sensor 106 provided in the coolant inlet hole (not shown), a voltage sensor 108, and a current sensor 110, and controls the ON (closing) and OFF (opening) actions of an FC contactor 86 to be described later, the opening/closing of and the degrees of opening of valves such as the shutoff valve 65, and controls an actuator for, for example, regulating the flow rate (airflow rate) of the air pump 50, based on the acquired signals. The pressure sensor 102 detects an anode pressure Pa. The pressure sensor 103 detects a cathode pressure Pk. The temperature sensor 104 detects a hydrogen temperature Th. The outside temperature sensor 105 detects an outside temperature Te outside a vehicle. The temperature sensor 106 detects a coolant temperature Tc. The voltage sensor 108 detects the voltage of each fuel cell (called "cell voltage" or "cell pair voltage"). The current sensor 110 detects a current value Io of the current flowing out from the fuel cell stack 12.

Figure 2:
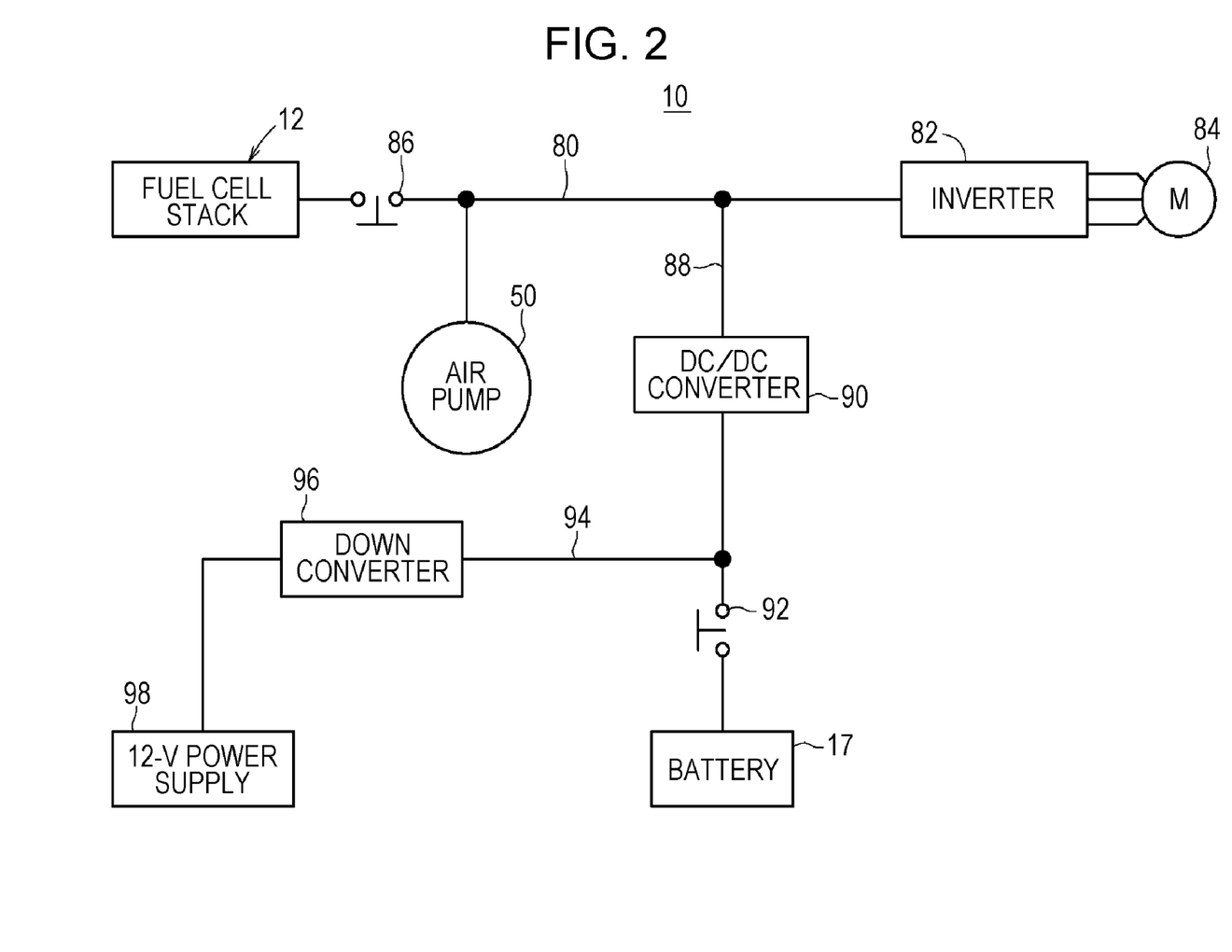
FIG. 2 is an explanatory diagram of circuits included in the fuel cell system.

As shown in FIG. 2, the fuel cell stack 12 is connected with one end of a main power line 80 whose other end is connected to an inverter 82. The inverter 82 is connected with a three-phase drive motor 84 for driving a vehicle. Substantially, main power lines 80 are used, but are described as a single main power line 80 for the sake of descriptive convenience. The same is applied to other lines to be described hereinafter.

The main power line 80 is provided with the FC contactor (main-power-supply ON/OFF unit, fuel cell stack ON/OFF unit) 86, and is connected with the air pump 50. The main power line 80 is connected with one end of a power line 88 to which the battery 17 is connected via a DC/DC converter 90 and a battery contactor (electric-storage-unit ON/OFF unit) 92. The power line 88 is provided with a branched power line 94 to which the 12-V power supply 98 is connected via a down converter (DC/DC converter) 96. The voltage of the 12-V power supply 98 has only to be lower than the voltage of the battery 17, and is not limited to 12 V.

The operation of the fuel cell system 10 with the foregoing configuration will be described below.

First, at the time of the normal operation of the fuel cell system 10 (also referred to as "at the time of normal power generation" or "at the time of a normal power generating process"), air is supplied to the air supply passage 52 via the air pump 50 included in the oxide-gas supply apparatus 14. The air is humidified through the humidifier 54, and is supplied to the oxide-gas inlet hole 38a of the fuel cell stack 12. The air moves along the oxide gas passage 34, provided in each fuel cell 20 in the fuel cell stack 12, to be supplied to the cathode electrode 24.

The used air is discharged into the air discharge passage 56 from the oxide-gas outlet hole 38b, and is supplied to the humidifier 54 to humidify air newly supplied. The air is then supplied to the dilution box 60 via the back pressure valve 58.

When the in-tank solenoid valve 63 and the shutoff valve 65 in the fuel-gas supply apparatus 16 are opened, the hydrogen gas from the hydrogen tank 62 is depressurized by a depressurization control valve (not shown), and is then supplied to the hydrogen supply passage 64. The hydrogen gas is supplied to the fuel-gas inlet hole 40a of the fuel cell stack 12 through the hydrogen supply passage 64. The hydrogen gas supplied into the fuel cell stack 12 moves along the fuel gas passage 36 of each fuel cell 20 to be supplied to the anode electrode 26.

The used hydrogen gas is sucked by the ejector 66 from the fuel-gas outlet hole 40b via the hydrogen circulation path 68, and is supplied to the fuel cell stack 12 again as a fuel gas. Therefore, the air supplied to the cathode electrode 24 electrochemically reacts with the hydrogen gas supplied to the anode electrode 26 to generate power.

An impurity is likely to be mixed in the hydrogen gas that circulates in the hydrogen circulation path 68. Accordingly, the impurity-containing hydrogen gas is supplied to the dilution box 60 via the purge valve 72 opened. This hydrogen gas is mixed with an air-off gas in the dilution box 60 to reduce (dilute) the hydrogen concentration, and is then discharged into the storage buffer (not shown).

During normal power generation, the scavenging apparatus 15 is not activated, and the air inlet valve 55 is kept closed. The air inlet valve 55 is preferably a normally closed on-off valve (which is closed when not energized).

Next, the "in-stop-mode power generating process of the fuel cell system 10" will be described, followed by a description of an anode scavenging process after the operation of the fuel cell system 10 is stopped. The description of this anode scavenging process will be described separately for two cases: one case where the anode scavenging process is executed immediately after the operation of the fuel cell system 10 is stopped (FC contactor 86 is set off) as a "first embodiment", and the other case where the anode scavenging process is executed after the soak time elapses after the operation of the fuel cell system 10 is stopped (FC contactor 86 is set off) as a "second embodiment". The in-stop-mode power generating process is also referred to as a "discharge process", "low-oxygen stoichiometric power generating process", "$O_2$ lean process" or "$O_2$ lean power generating process".

The anode scavenging process according to the first embodiment is executed when the outside temperature Te, which is continuously detected (actually, intermittently detected for every predetermined time) by the outside temperature sensor 105, becomes a subfreezing temperature, or is predicted to be likely to become a subfreezing temperature during the normal power generation of the fuel cell system 10 or during the in-stop-mode power generating process.

The anode scavenging process according to the second embodiment is executed when the outside temperature Te, which is continuously detected (actually, intermittently detected for every predetermined time) by the outside temperature sensor 105, does not become a subfreezing temperature, or is not predicted to be likely to become a subfreezing temperature during the normal power generation or during the in-stop-mode power generating process, but when the outside temperature Te becomes a subfreezing temperature, or is predicted to be likely to become a subfreezing temperature during soaking after the operation of the fuel cell system 10 is stopped (the FC contactor 86 is set off).

(Description of in-Stop-Mode Power Generating Process of Fuel Cell System 10)

First, the in-stop-mode power generating process of the fuel cell system 10 will be described below referring to a timing chart illustrated in FIG. 3.

The fuel cell system 10 mounted in a fuel cell vehicle (not shown) executes the normal power generation in the foregoing manner, the vehicle runs desirably. When an unillustrated ignition switch is set off, the controller 18 detects the turn-off action as an operation stop instruction (time t1 in FIG. 3), and initiates the operation stopping process for the fuel cell system 10.

Figure 4:
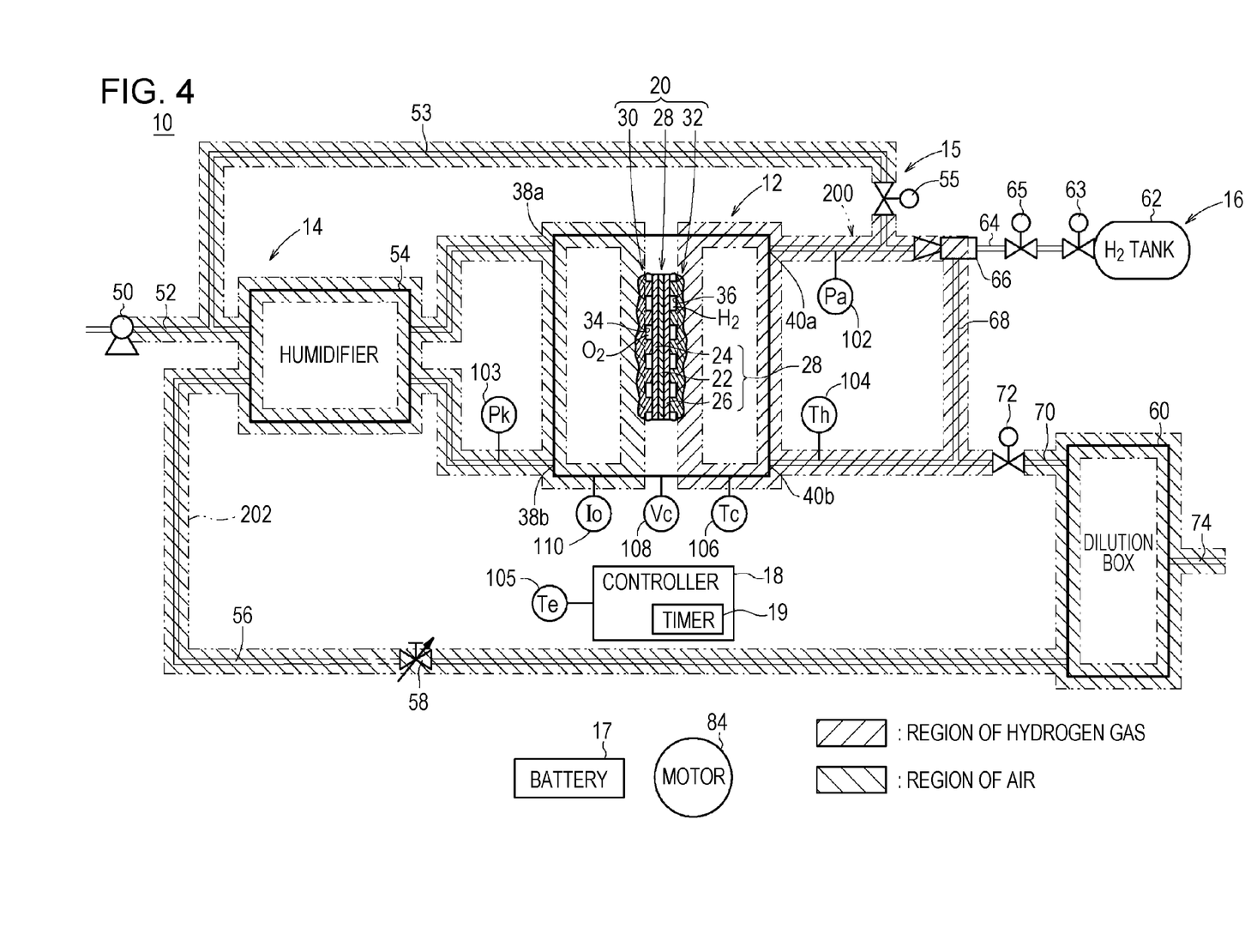
FIG. 4 is an explanatory diagram of a hydrogen-gas volume part and an air volume part in the fuel cell system.

First, after a discharge process (in-stop-mode power generating process), the supply pressure of the hydrogen gas (fuel gas) is set beforehand so that the fuel-gas pressure (anode pressure Pa) in the fuel cell stack 12 is kept at a set pressure. Specifically, as shown in FIG. 4, a hydrogen-gas volume part 200 which is closed after being filled with the hydrogen gas includes the fuel gas passages 36, the fuel-gas inlet hole 40a and the fuel-gas outlet hole 40b in the fuel cell stack 12, a downstream region downstream of the ejector 66 in the hydrogen supply passage 64, the hydrogen circulation path 68, an upstream region upstream of the purge valve 72 in the off-gas passage 70.

An air volume part 202 which replaces an air atmosphere with a nitrogen atmosphere or an inactive gas includes the oxide gas passages 34, the oxide-gas inlet hole 38a and the oxide-gas outlet hole 38b in the fuel cell stack 12, the air supply passage 52, the air discharge passage 56, the humidifier 54, the dilution box 60 and the storage buffer (not shown).

At the time of the discharge process, air is supplied with an oxygen stoichiometric ratio lower than the oxygen stoichiometric ratio in normal power generation mode. Specifically, the low oxygen stoichiometric ratio is set around a value of 1. It is preferable that the oxygen stoichiometric ratio should fall between 1.2 to 1.8 in normal power generation mode. The supply of the hydrogen gas is stopped at the time of the discharge process.

Accordingly, $nO_2$ or the number of moles of the residual oxygen in the air volume part 202 which are to be set to a nitrogen atmosphere in the fuel cell stack 12, $n'O_2$ or the number of moles of the oxygen in the humidifier 54, the dilution box 60 and the storage buffer which are to be set to a nitrogen atmosphere by the low oxygen stoichiometric ratio, and $nH_2$ or the number of moles of the residual hydrogen in the hydrogen-gas volume part 200 are set to have a relation of $2(nO_2+n'O_2)=nH_2$.

Figure 3:
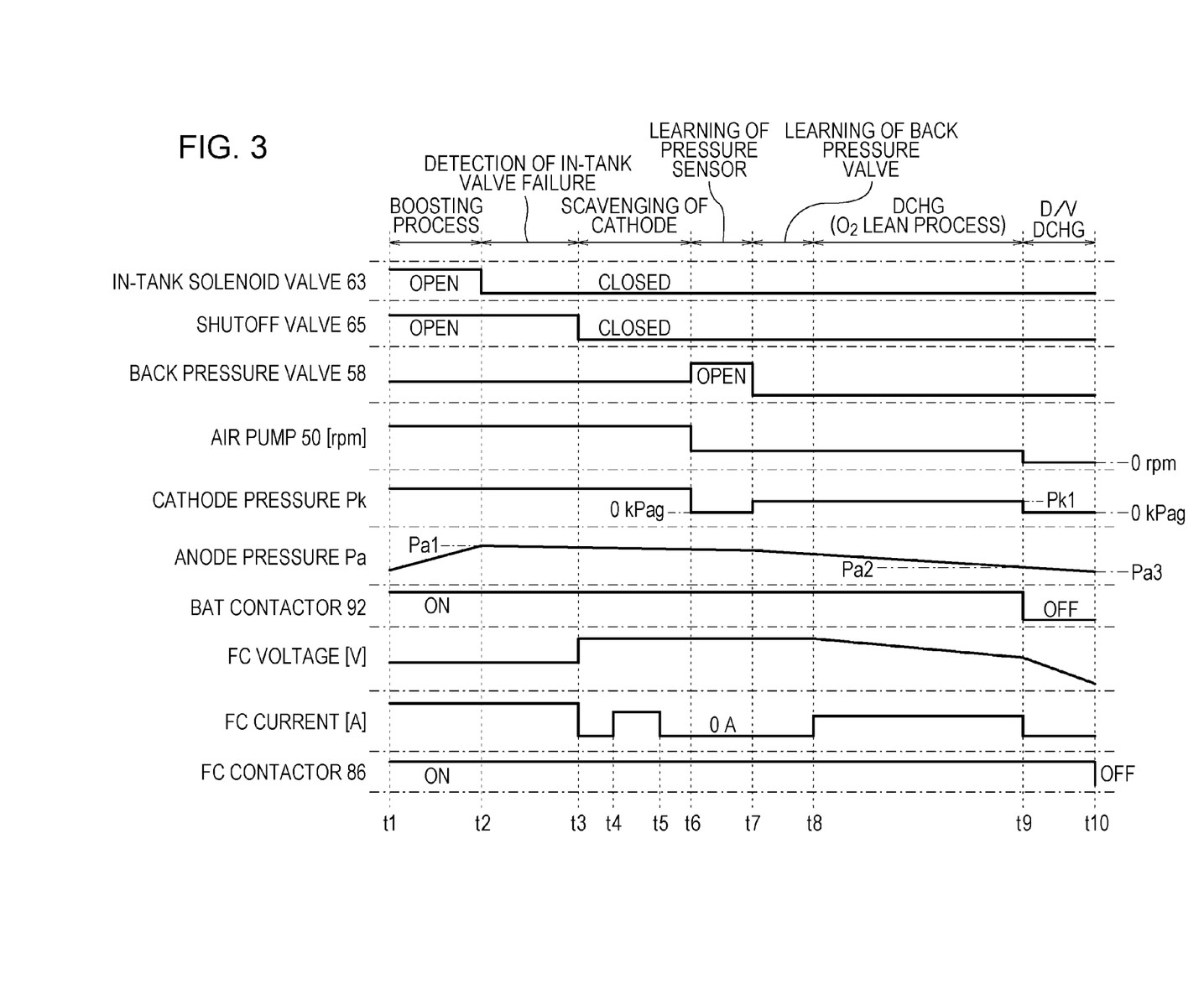
FIG. 3 is a timing chart illustrating the control method.

The supply pressure (anode pressure), Pa1, of the hydrogen gas is calculated from the set number of moles of the residual hydrogen $nH_2$ using an equation of $n=P\times V/R\times T$ where n represents the number of moles, P represents the pressure, V represents the volume, R represents a gas constant, and T represents the absolute temperature (see FIG. 3). It is to be noted that the anode pressure Pa1 is set so as to be kept equal to or higher than a constant pressure Pa2 when the discharge process is completed. The constant pressure Pa2 is low enough to prevent hydrogen from running short or being present excessively.

When a relation of (the volume of the air volume part 202)>>(the volume of the hydrogen-gas volume part 200) is fulfilled, it is possible to employ a method of increasing the pressure to the anode pressure Pa1, or a method of supplying hydrogen gas for the deficit hydrogen in order to increase the volume of the hydrogen-gas volume part 200.

When a relation of (the volume of the hydrogen-gas volume part 200)>>(the volume of the air volume part 202) is fulfilled, on the other hand, a method of reducing the pressure to the anode pressure Pa1 is employed to decrease the volume of the hydrogen-gas volume part 200.

When the ignition switch (operation switch) is set off (time t1), as shown in FIG. 3, the hydrogen gas is supplied to the fuel cell stack 12 with the in-tank solenoid valve 63 and the shutoff valve 65 being opened, so that the pressure in the fuel cell stack 12 rises to the anode pressure Pa1 (times t1 to t2: boosting process). This anode pressure Pa1 is calculated by the aforementioned equation.

When the boosting process is terminated (time t2), the in-tank solenoid valve 63 is closed, and the processing shifts to a process of detecting a failure of the in-tank solenoid valve 63. In the failure detecting process, a failure in the in-tank solenoid valve 63 is detected according to the present/absence of a change in pressure directly below the in-tank solenoid valve 63. When the pressure drops, the in-tank solenoid valve 63 is regarded as normal. That is, it is determined that the in-tank solenoid valve 63 is closed properly.

When the failure detecting process for the in-tank solenoid valve 63 is terminated (time t3), a cathode scavenging process is executed. In the cathode scavenging process, a scavenging process based on air (using the oxide-gas supply apparatus 14) is performed to blow off liquid droplets or the like containing water droplets on the cathode side. In this process, power insufficient to drive the air pump 50 which is set to have a high number of rotations [rpm] is supplemented (times t4 to t5).

After the cathode scavenging process, control on the degree of opening of the back pressure valve 58 is temporarily stopped, and the back pressure valve 58 is opened to communicate with the atmosphere, so that the cathode pressure Pk is set to PK=0 [kPag] where g means the gauge pressure (times t6 to t7). Further, when the cathode scavenging process is terminated (time t6), the number of rotations of the air pump 50 included in the oxide-gas supply apparatus 14 is reduced considerably as compared with that in normal operation mode, so that the oxide gas is supplied to with the oxygen stoichiometric ratio being lower than the oxygen stoichiometric ratio in normal operation mode. Specifically, the oxygen stoichiometric ratio is preferably set around 1. Then, a learning process (compensation for 0 point) for the pressure sensor 103 is executed.

Thereafter, the degree of opening of the back pressure valve 58 is adjusted at times t7 to t8 to set the cathode pressure Pk detected by the pressure sensor 103 to a predetermined low pressure Pk1 corresponding to the low oxygen stoichiometric ratio, and a learning process for the back pressure valve 58 at the low pressure Pk1 is executed (times t7 to t8). Thereafter, the cathode pressure Pk is kept set at the low pressure Pk1 until the air pump 50 is turned off (time t9).

Meanwhile, the fuel cell stack 12 keeps generating power (times t1 to t8).

In the low-oxygen stoichiometric power generating process (also referred to as "$O_2$ lean power generating process" or simply as "$O_2$ lean process"; times t8 to t9) after the learning process for the back pressure valve 58 (times t7 to t8), the current (FC current) to be acquired from the fuel cell stack 12 is set to a value which inhibits the hydrogen gas as the fuel gas from passing through the solid polymer electrolyte membrane 22 to move toward the cathode from the anode. At this time, the FC contactor 86 and the battery contactor 92 are set on in FIG. 2, and power obtained when the fuel cell stack 12 generates power is reduced by the DC/DC converter 90 to be charged in the battery 17.

As described above, while air with a low oxygen stoichiometric ratio is supplied to the fuel cell stack 12, the fuel cell stack 12 is generating power with supply of the hydrogen gas being stopped by the closure of the shutoff valve 65 (time t3). The purge valve 72 is also closed. The power generated by the fuel cell stack 12 is supplied to the battery 17 to be discharged (DCHG ($O_2$ lean process) in FIG. 3). When the power generated by the fuel cell stack 12 drops to a predetermined voltage, i.e., to a voltage which cannot be supplied to the battery 17 (substantially the same voltage as the voltage of the battery 17), therefore, the generated power is supplied only to the air pump 50.

Accordingly, while the hydrogen concentration on the anode side drops in the fuel cell stack 12 during the $O_2$ lean process (times t8 to t9), the oxygen concentration on the cathode side drops. Therefore, when the hydrogen pressure (anode pressure Pa) becomes equal to or lower than the predetermined pressure Pa2, for example, the air pump 50 is turned off, and the battery contactor 92 is set off (time t9).

Accordingly, the fuel cell stack 12 generates power according to the reaction of the hydrogen gas and air present inside the fuel cell stack 12 with each other (times t9 to t10). The power that is generated by the power generation of the fuel cell stack 12 is reduced via the down converter 96 to be charged in the 12-V power supply 98 (D/V DCHG in FIG. 3), and the power is supplied to a radiator fan or the like (not shown) as needed. Further, when the voltage generated by the fuel cell stack 12 drops down to near the operational limit voltage of the down converter 96, the FC contactor 86 is set off (time t10). As a result, the fuel cell system 10 goes to an operation stopped state or what is called a soaked state.

As described above, when the ignition switch is set off (time t1), the anode pressure Pa in the fuel cell stack 12 rises to the anode pressure Pa1 before supply of the hydrogen gas is stopped (time t2), and then the back pressure valve 58, the air pump 50, the in-tank solenoid valve 63 and the shutoff valve 65 are actuated. Therefore, the fuel cell stack 12 generates power according to the reaction of the hydrogen gas and air with a low-oxygen stoichiometric ratio, which remain inside the fuel cell stack 12, with each other, and the generated power is supplied to the battery 17 to be discharged (times t2 to t9).

Accordingly, the hydrogen concentration decreases on the anode side in the fuel cell stack 12, and the oxygen concentration decreases on the cathode side, thereby increasing the nitrogen concentration. As a result, a nitrogen gas with a high concentration is produced as an exhaust gas on the cathode side, and the nitrogen gas is supplied to the dilution box 60.

Therefore, the air volume part 202 including the fuel cell stack 12 shown in FIG. 4 can be filled with the nitrogen gas which is an inactive gas.

In addition, the supply pressure of the hydrogen gas to be supplied to the fuel cell stack 12 is increased to the anode pressure Pa1 (time t2) before supply of the hydrogen gas is stopped. This can bring about an effect that low-oxygen stoichiometric power generation ($O_2$ lean process) is carried out properly with the fuel cell stack 12 being filled with an adequate amount of hydrogen, surely preventing an excessive hydrogen gas from remaining inside the fuel cell stack 12 or a hydrogen gas in the fuel cell stack 12 from running short, after discharging is completed.

Further, with the air pump 50 being stopped (time t9), the fuel cell stack 12 is caused to generate power according to a reaction of only hydrogen and oxygen remaining in the fuel cell stack 12 with each other (D/V DCHG in FIG. 3).

Therefore, the nitrogen-gas replacement range in the system is limited within the fuel cell stack 12 when the power generation of the fuel cell stack 12 is carried out while supplying air via the air pump 50, whereas the nitrogen-gas replacement range is expanded to the inlet side of the fuel cell stack 12 when the power generation of the fuel cell stack 12 is carried out after the air pump 50 is stopped. This brings about an advantage that even when the fuel cell system 10 is stopped for a comparatively long period of time, deterioration of the fuel cells 20 on the cathode side can be prevented as much as possible.

Figure 5:
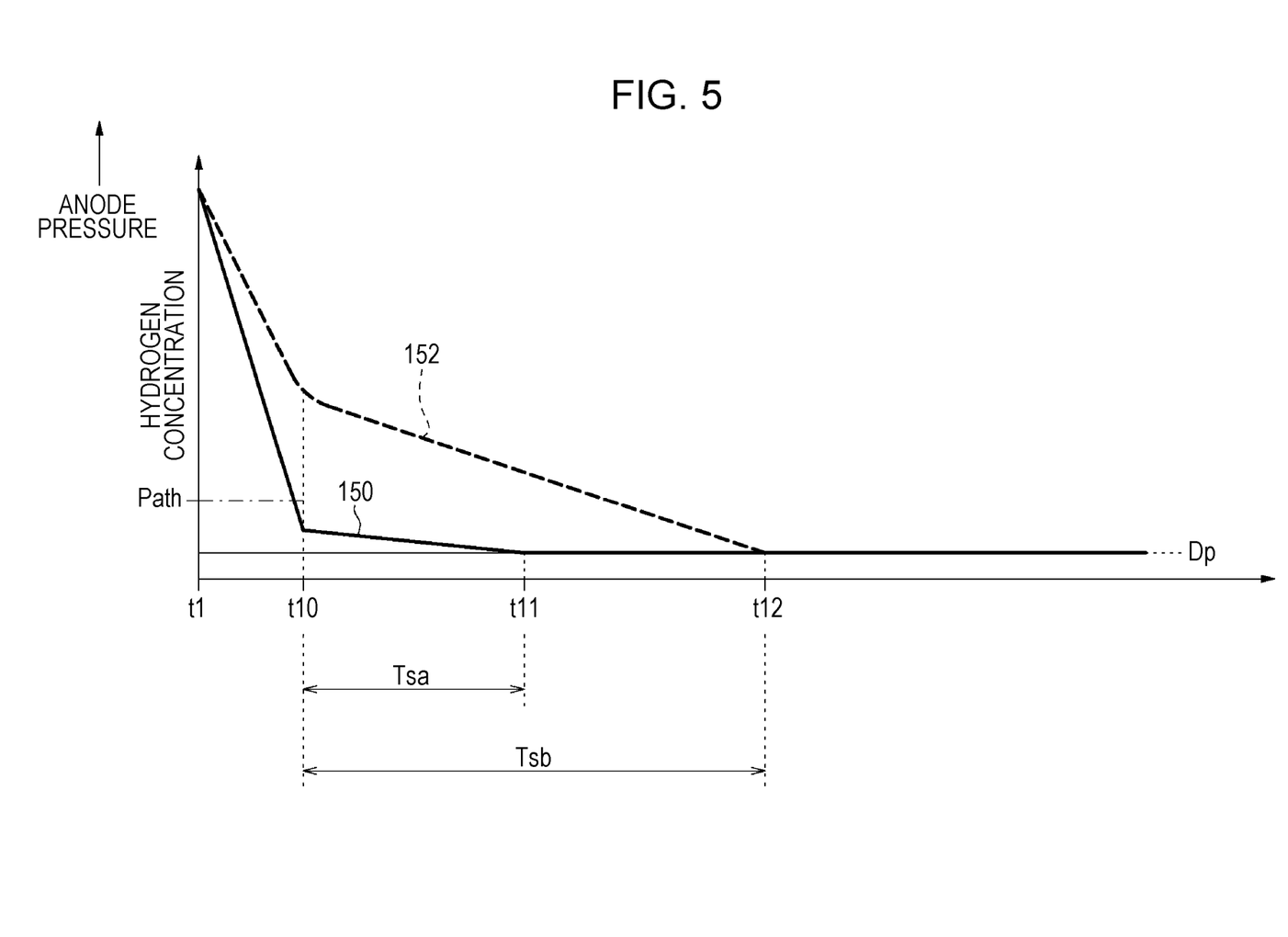
FIG. 5 is an explanatory diagram of the anode pressure v.s. soak time characteristics corresponding to whether or not low-oxygen stoichiometric power generation is executed.

An anode pressure characteristic 150 indicated by a solid line in FIG. 5 represents the decreasing characteristic of the anode pressure Pa when the low-oxygen stoichiometric power generation ($O_2$ lean power generation) is executed. An anode pressure characteristic 152 indicated by a dotted line in FIG. 5 represents the decreasing characteristic of the anode pressure Pa when the low-oxygen stoichiometric power generation ($O_2$ lean power generation) is not executed (when the FC contactor 86 is set off at the ignition-off time (time t1)).

When the low-oxygen stoichiometric power generation ($O_2$ lean power generation) in which the shutoff valve 65 and the purge valve 72 are closed is executed, hydrogen is consumed by the power generation. As a result, the anode pressure drops abruptly, and drops down to or below a threshold pressure Path at a power-generation stop time (time t10) when the FC contactor 86 is set off.

When the low-oxygen stoichiometric power generation ($O_2$ lean power generation) is not executed, on the other hand, power is not generated, and the anode pressure Pa just drops due to diffusion or the like of the fuel gas (hydrogen). Therefore, the anode pressure does not fall below the threshold pressure Path.

The threshold pressure Path takes a value which has been confirmed beforehand through simulation and/or experiments or the like such that the anode pressure Pa falls below the threshold pressure Path when the low-oxygen stoichiometric power generation ($O_2$ lean power generation) is executed, but does not fall below the threshold pressure Path when the low-oxygen stoichiometric power generation ($O_2$ lean power generation) is not executed.

The deterioration characteristic 150 for the case where low-oxygen stoichiometric power generation ($O_2$ lean power generation) is executed at or after the time when the FC contactor 86 is set off (time t10) shows that the anode pressure Pa slowly drops and the amount of hydrogen decreases. As a result, at an elapsed time (t11) of a soak time (also called "first soak time") Tsa, a hydrogen concentration Dp on the anode side reaches a low concentration of about 2%, for example, at which hydrogen need not be diluted to be discharged outside.

By way of contrast, the deterioration characteristic 152 for the case where low-oxygen stoichiometric power generation ($O_2$ lean power generation) is not executed at or after the time when the FC contactor 86 is set off (time t10) shows that the anode pressure Pa drops comparatively fast. It is to be noted however that because the anode pressure Pa at the time when the FC contactor 86 is set off (time t10) is high, a soak time for the anode pressure Pa to reach the low hydrogen concentration Dp at which hydrogen dilution is not needed (also called "second soak time") Tsb (t12-t10) becomes significantly longer than the first soak time Tsa (Tsb>>Tsa).

First Embodiment

Description of Anode Scavenging Process to be Executed Immediately after the Operation Stops (FC Contactor 86 is Set Off)

Figure 6:
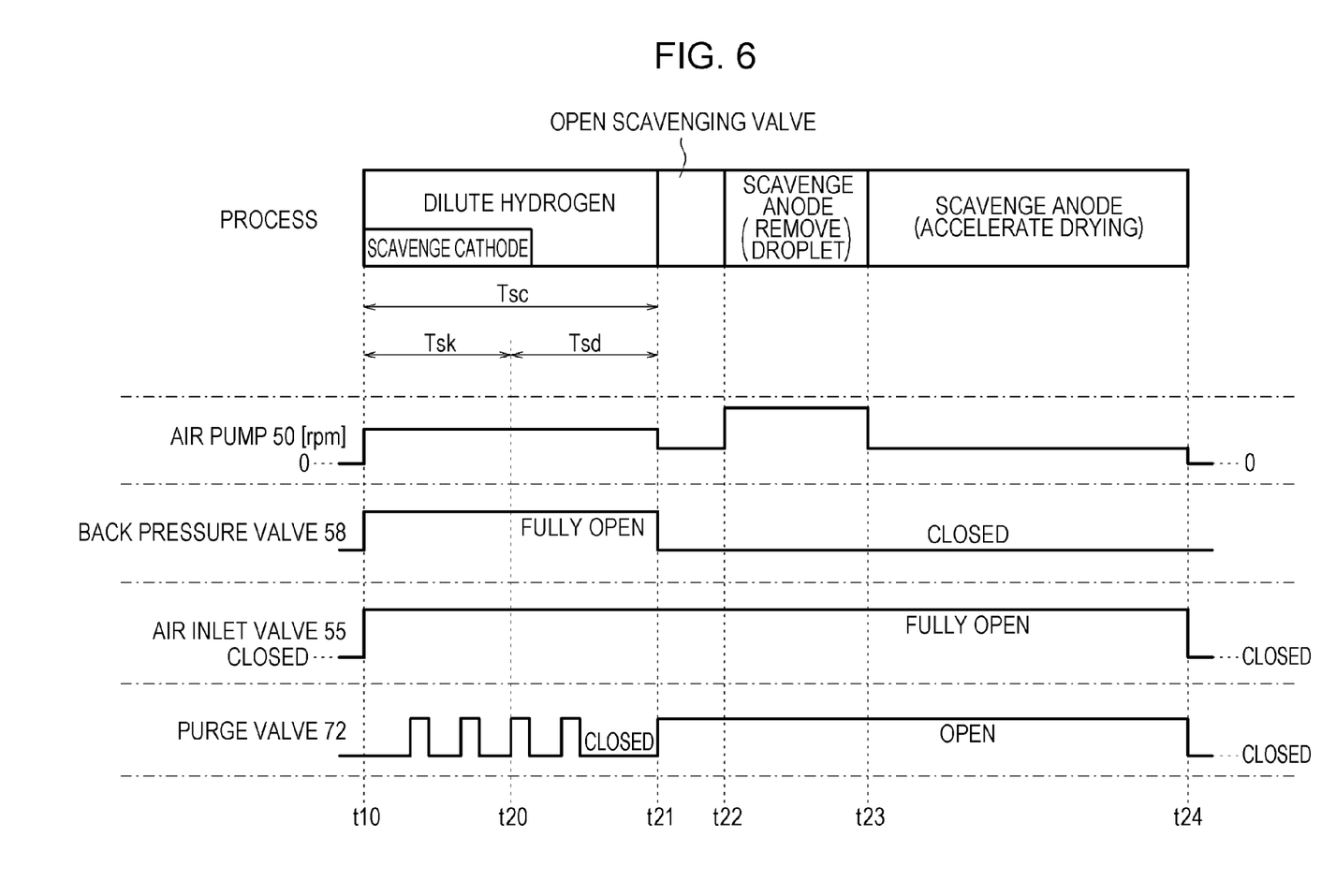
FIG. 6 is an explanatory diagram of the timing for an anode scavenging process which is executed after the operation of the fuel cell system is stopped.
Figure 7:
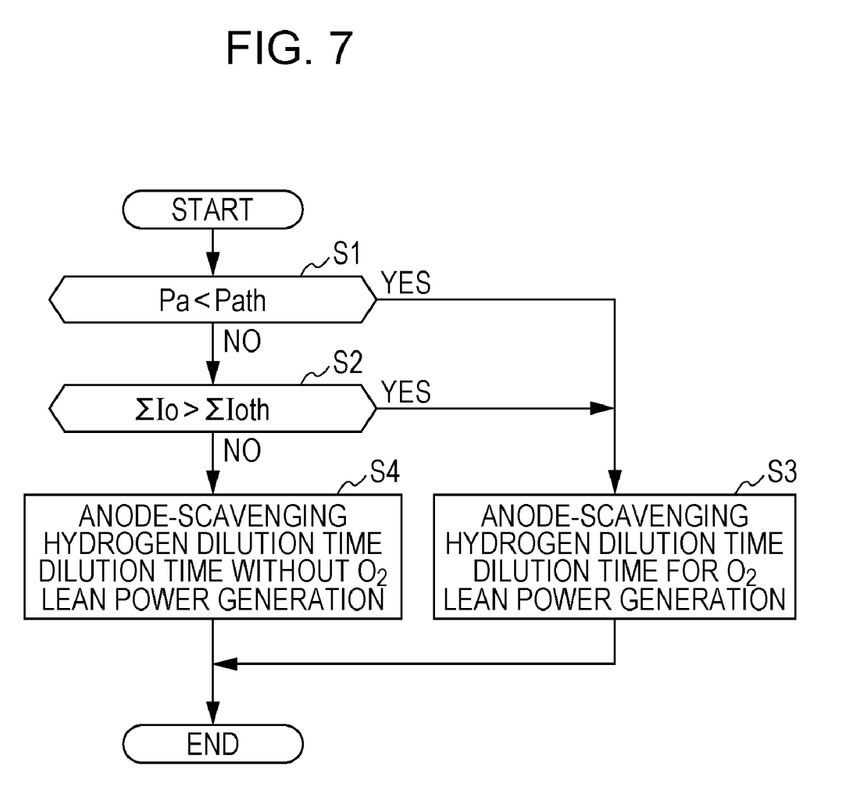
FIG. 7 is a flowchart used to explain the anode scavenging process which is executed after the operation of the fuel cell system is stopped.

When the outside temperature Te, which is continuously detected (actually, intermittently detected for every predetermined time) by the outside temperature sensor 105, becomes a subfreezing temperature, or is predicted by the controller 18 to be likely to become a subfreezing temperature during the normal power generation of the fuel cell system 10 (until time t1 in FIG. 3) or during the in-stop-mode power generating process (times t8 to t9 in a narrow sense, and times t1 to t10 in a broad sense), the anode scavenging process according to the first embodiment based on a timing chart in FIG. 6 and a flowchart in FIG. 7 is executed immediately after the operation of the fuel cell system 10 is stopped (FC contactor 86 is set off).

In the anode scavenging process according to the first embodiment, the hydrogen diluting process starts immediately after the operation of the fuel cell system 10 is stopped (FC contactor 86 is set off) (time t10), and the cathode scavenging process is executed. That is, the back pressure valve 58 is opened to drive the air pump 50, and the air inlet valve 55 is opened (time t10).

Under this condition, as shown in FIG. 6, the purge valve 72 is intermittently opened to set the concentration of the discharged hydrogen to or lower than a predetermined concentration in a hydrogen diluting period Tsc.

In this case, on the cathode side, compressed air is supplied to the cathode of the fuel cell 20 via the air supply passage 52, the humidifier 54 and the oxide-gas inlet hole 38a, passes through the cathode electrode 24 of the fuel cell 20, flows through the oxide-gas outlet hole 38b into the dilution box 60 via the humidifier 54, the back pressure valve 58 and the air discharge passage 56.

On the anode side where the shutoff valve 65 is closed, on the other hand, compressed air flows to the anode of the fuel cell 20 through the fuel-gas inlet hole 40a via the air inlet valve 55, and an air-hydrogen mixed gas or the compressed air that is mixed with the fuel gas in the anode is discharged through the fuel-gas outlet hole 40b from the anode side of the fuel cell 20, and flows into the dilution box 60 via the purge valve 72 and the off-gas passage 70. In this manner, the hydrogen gas in the anode of the fuel cell 20 is intermittently and gradually diluted. The air-hydrogen mixed gas is eventually discharged outside from the dilution box 60 through the discharge passage 74.

A description will now be given of the difference (time difference) between the hydrogen diluting period (time for the hydrogen diluting process) Tsc shown in FIG. 6 when low-oxygen stoichiometric power generation ($O_2$ lean power generation) is executed and the hydrogen diluting period Tsc when low-oxygen stoichiometric power generation ($O_2$ lean power generation) is not executed.

When low-oxygen stoichiometric power generation ($O_2$ lean power generation) is executed, the amount of hydrogen at the time the in-stop-mode power generating process is completed (time t10) is less than that when low-oxygen stoichiometric power generation ($O_2$ lean power generation) is not executed. It is therefore possible to reduce the number of purging processes, thus shortening the hydrogen diluting period Tsc.

Whether low-oxygen stoichiometric power generation ($O_2$ lean power generation) has been executed during the process of stopping the fuel cell system 10 is determined by executing, for example, the processing of the flowchart illustrated in FIG. 7 at the time the in-stop-mode power generating process is completed (time t10).

In step S1, it is determined whether the anode pressure Pa is lower than the threshold pressure Path (FIG. 5). When the anode pressure Pa is lower than the threshold pressure Path, in which case it is considered that the low-oxygen stoichiometric power generation ($O_2$ lean power generation) has been executed. Then, in step S3, the hydrogen diluting period Tsc associated with anode scavenging is selected to be short (the number of times the purge valve 72 is opened is reduced).

When the decision in step S1 is negative (including a case where the anode pressure Pa is not measured), it is determined in step S2 whether an accumulated current value ΣIo in a period which is the sum of the time for low-oxygen stoichiometric power generation (DCHG ($O_2$ lean power generation): t9-t8) and the power generation time using the down converter 96 (D/V DCHG: t10-t9) in FIG. 3 is greater than a threshold current value ΣIoth. When the accumulated current value ΣIo is greater than the threshold current value ΣIoth, in which case it is considered that the low-oxygen stoichiometric power generation ($O_2$ lean power generation) has been executed. Then, in step S3, the hydrogen diluting period Tsc associated with anode scavenging is selected to be short (the number of times the purge valve 72 is opened is reduced). At least one of the decisions in steps S1 and S2 has only to be made.

When both of the decisions in steps S1 and S2 are negative, in which case it is considered that the low-oxygen stoichiometric power generation ($O_2$ lean power generation) has not been executed. Then, in step S4, the hydrogen diluting period Tsc associated with anode scavenging is selected to be long.

In steps S3 and S4 in the flowchart in FIG. 7, there is a relation of dilution time for executing $O_2$ lean power generation<dilution time without $O_2$ lean power generation.

When low-oxygen stoichiometric power generation ($O_2$ lean power generation) is executed, the time for generating the scavenging gas after power generation of the fuel cell system 10 is stopped can be shortened by setting the drive time for the air pump 50 corresponding to the hydrogen diluting period Tsc for dilution by the scavenging apparatus 15 shorter than the generation time when low-oxygen stoichiometric power generation ($O_2$ lean power generation) is not executed. Because the scavenging apparatus 15 needs to be driven to generate the scavenging gas, the time of driving the scavenging apparatus 15 can be made shorter, thus reducing consumed energy after power generation of the fuel cell system 10 is stopped.

Next, at a time when the hydrogen diluting process is completed (time t21) in the timing chart in FIG. 6, the number of rotations of the air pump 50 is temporarily reduced to execute a process of opening the scavenging valve (times t21 to t22). In the scavenging-valve opening process, the back pressure valve 58 is closed, and the purge valve 72 as the scavenging valve is opened with the air inlet valve 55 closed.

Next, after the scavenging-valve opening process (time t22), air whose airflow rate is increased by increasing the number of rotations of the air pump 50 is discharged from the air pump 50 to scavenge the anode side with the air for removing liquid droplets. In this case, the air with the increased airflow rate is supplied to the anode side through the fuel-gas inlet hole 40a via the air inlet passage 53 and the air inlet valve 55. The air supplied to the anode side blows off liquid droplets in the anode. The blown liquid droplets are discharged via the dilution box 60 through the fuel-gas outlet hole 40b, the purge valve 72 and the off-gas passage 70.

After the anode scavenging process for removing liquid droplets with a high airflow rate is completed (time t23), the airflow rate of the air pump 50 is reduced, after which the anode scavenging process for accelerating drying is executed for a predetermined time. Thereafter, the air inlet valve 55 and the purge valve 72 are closed at the same time driving the air pump 50 is stopped, completing the anode scavenging process for accelerating drying (time t24).

The oxide gas passage 34 on the cathode side and the fuel gas passage 36 on the anode side can be dried sufficiently to have a predetermined water content (same as the water containing ratio) in the above manner. As a result, the fuel cell system 10 can be reliably restarted even under a next low-temperature environment such as a subfreezing environment.

Second Embodiment

Description of Anode Scavenging Process to be Executed after Elapse of the Soak Time after the Operation Stops (FC Contactor 86 is Set Off)

Figure 8:
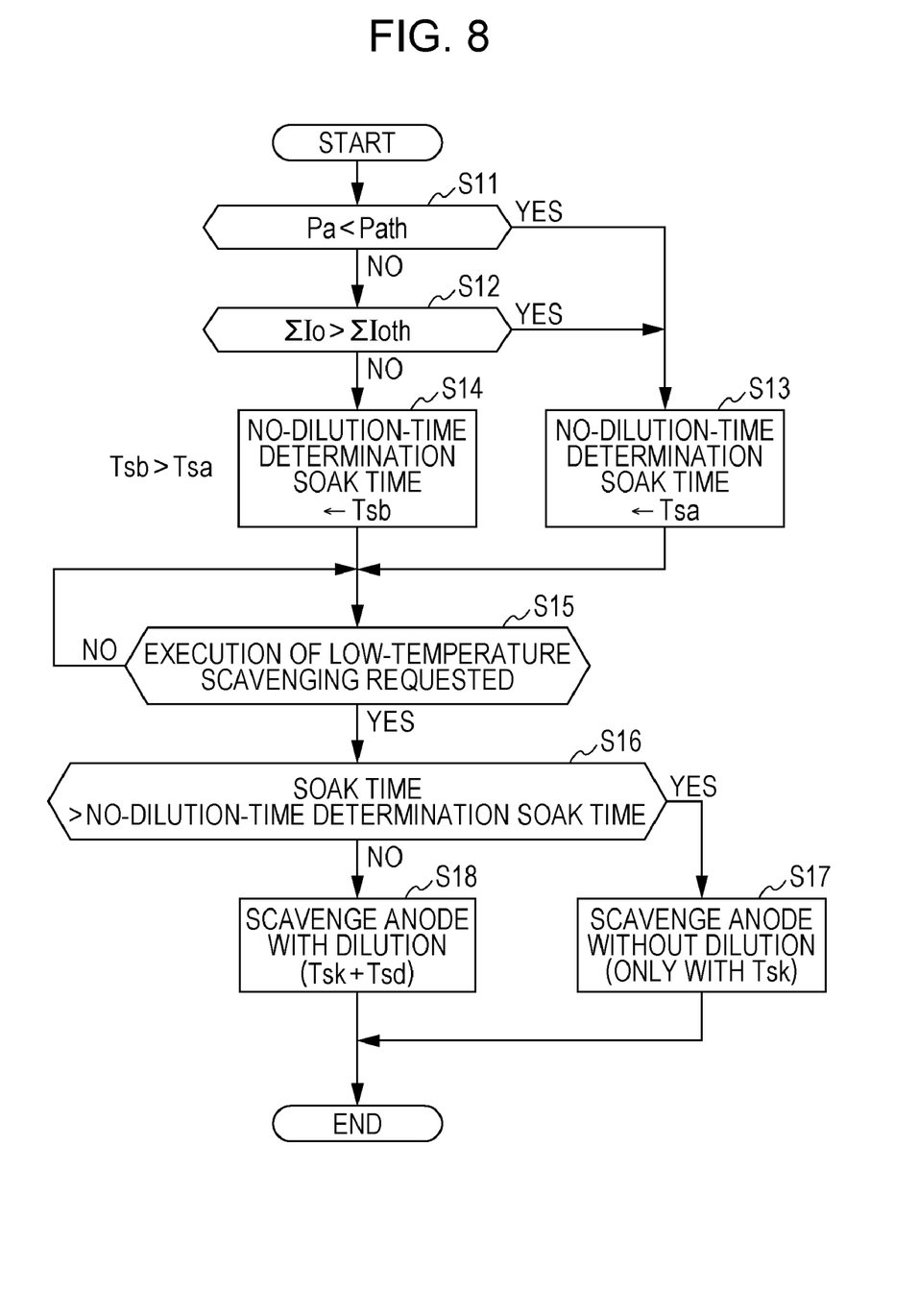
FIG. 8 is a flowchart used to explain the anode scavenging process which is executed in a soak period after the operation of the fuel cell system is stopped.

When the outside temperature Te, which is continuously detected (actually, intermittently detected for every predetermined time) by the outside temperature sensor 105, becomes a subfreezing temperature, or is predicted to be likely to become a subfreezing temperature during soaking after the operation of the fuel cell system 10 is stopped (FC contactor 86 is set off; time t10 in FIG. 3), the anode scavenging process illustrated in FIG. 6 is changed based on whether low-oxygen stoichiometric power generation ($O_2$ lean power generation) has been executed, and the soak time, and is executed based on a flowchart in FIG. 8.

In step S11 and step S12, it is determined whether the anode pressure Pa is lower than the threshold pressure Path (see FIG. 5) as done in step S1 and step S2. When the anode pressure Pa is lower than the threshold pressure Path (Pa<Path), it is considered that low-oxygen stoichiometric power generation ($O_2$ lean power generation) has been executed, and a no-dilution-time determination soak time is which is used in the following description is set to a short soak time Tsa (see FIG. 5) in step S13.

When the decision in step S11 is negative (including a case where the anode pressure Pa is not measured), it is determined in step S12 whether the accumulated current value ΣIo in the period which is the sum of the time for low-oxygen stoichiometric power generation (DCHG ($O_2$ lean power generation): t9-t8) and the power generation time using the down converter 96 (D/V DCHG: t10-t9) in FIG. 3 is greater than the threshold current value $\Sigma$Ioth. When the accumulated current value $\Sigma$Io is greater than the threshold current value $\Sigma$Ioth, in which case it is considered that the low-oxygen stoichiometric power generation ($O_2$ lean power generation) has been executed, and the no-dilution-time determination soak time is set to the short soak time Tsa (see FIG. 5) in step S13.

When both of the decisions in steps S11 and S12 are negative, in which case it is considered that the low-oxygen stoichiometric power generation ($O_2$ lean power generation) has not been executed, and the no-dilution-time determination soak time is set to a long soak time Tsb (see FIG. 5) in step S14.

Next, when the outside temperature Te, which is continuously detected (actually, intermittently detected for every predetermined time) by the outside temperature sensor 105, becomes a subfreezing temperature, or is predicted to be likely to become a subfreezing temperature during soaking after the operation of the fuel cell system 10 is stopped (FC contactor 86 is set off; time t10 in FIG. 3), it is determined that there is a request for execution of low-temperature scavenging.

Next, an elapsed time since stopping of power generation (FC contactor 86 has been set off) when the decision in step S15 is positive, i.e., the soak time Ts, is acquired from the timer 19.

Then, it is determined in step S16 whether the soak time is larger than the no-dilution-time determination soak time Tsa, Tsb.

When the soak time is long and Ts>Tsa or Ts>Tsb, dilution is carried out only for a dilution time (time for the diluting process) Tsk from the time t10 shown in FIG. 6 (in this case, the time at which the decision in step S15 is positive), i.e., the cathode scavenging time Tsk, and the diluting process from time t20 to time t21 is skipped to shift to the anode scavenging process at and after time t21 (step S17).

When the soak time Ts is short and Ts≦Tsa or Ts≦Tsb, the diluting process is carried out for a dilution time Tsk+ Tsd=Tsc from time t10 shown in FIG. 6 (also the time at which the decision in step S15 is positive in this case), and the processing is shifted to the anode scavenging process at and after time t21 (step S18).

(Overview of Embodiments)

As described above, the foregoing embodiments provide a control method for the fuel cell system 10 having the fuel cells 20 that generate power according to an electrochemical reaction of an oxide gas supplied to the cathode side with a fuel gas supplied to the anode side, the oxide-gas supply apparatus 14 that supplies the oxide gas to the fuel cells 20, the fuel-gas supply apparatus 16 that supplies the fuel gas to the fuel cells 20, and the scavenging apparatus 15 that executes the diluting process of diluting the concentration of the fuel gas in the anode of each fuel cell 20, and then supplies a scavenging gas such as compressed air into the anode for scavenging, when the outside temperature Te is equal to or lower than a predetermined temperature, e.g., the freezing point.

The control method includes determining, upon detection of an instruction to stop the operation of the fuel cells 20 (time t1), whether the in-stop-mode power generating process (times t8 to t9) of stopping supply of the fuel gas, and supplying the oxide gas to the fuel cells 20 to generate power therefrom has been executed, and shortening the time for the diluting process to be executed by the scavenging apparatus 15 (dilution time Tsa) when it is determined that the in-stop-mode power generating process has been executed, as compared with a case where it is determined that the in-stop-mode power generating process has not been executed.

When the in-stop-mode power generating process is executed, the hydrogen concentration of the fuel gas drops. Therefore, the hydrogen diluting process which is executed by the scavenging apparatus 15 does not use much scavenging gas (dilution gas). When it is determined that the in-stop-mode power generating process has been executed, the time for generating the scavenging gas after power generation of the fuel cell system 10 is stopped can be shortened by setting the time (Tsc) for the diluting process by the scavenging apparatus 15 shorter as compared with the case where it is determined that the in-stop-mode power generating process has not been executed. It is therefore possible to reduce energy needed to drive the air pump 50 or the like.

In this case, when the elapsed time (soak time Ts) till activation of the scavenging apparatus 15 after the in-stop-mode power generating becomes longer, the residual hydrogen gas is gradually diffused from the anode side during the elapsed time. Therefore, the time (Tsc) for the diluting process may be set shorter.

Because the diluting process does not need much dilution gas, executing the diluting process together with the cathode scavenging process can shorten the time for automatically activating the fuel cell system 10 after the fuel cell system 10 is stopped (FC contactor 86 is set off), thereby improving the merchantability.

Furthermore, according to the control method, whether the in-stop-mode power generating process has been executed is preferably determined based on the anode pressure Pa when power generation of the fuel cell 20 is stopped. In this case, a phenomenon that the anode pressure Pa is decreased by execution of the in-stop-mode power generating process is used. Because the pressure sensor 102 which detects the pressure on the anode side is normally mounted in the fuel cell system 10, the use of the phenomenon does not raise the cost.

Moreover, according to the control method, whether the in-stop-mode power generating process has been executed is preferably determined based on the accumulated current value $\Sigma$Io from the point of detecting the instruction to stop the operation of the fuel cell to the point of stopping power generation (accumulated value of the current Io between times t8 and t9 or between times t8 and t10. In this case, a phenomenon that the accumulated current value $\Sigma$Io is increased by execution of the in-stop-mode power generating process. Because the current sensor 110 normally detects the current value Io in the fuel cell system 10, the use of the phenomenon does not raise the cost for calculating the accumulated current value $\Sigma$Io of the current value Io.

According to the embodiments, in the case where the scavenging process for scavenging the anode side with a scavenging gas (anode scavenging process) is executed after the operation of the fuel cell system 10 is stopped (FC contactor 86 is set off) when the outside temperature Te becomes a predetermined low temperature like the subfreezing point, or is likely to become equal to or lower than the predetermined low temperature during the operation of the fuel cell system 10, it is determined whether the in-stop-mode power generating process of stopping supply of a fuel gas, and supplying an oxide gas with a low-oxygen stoichiometric ratio to the fuel cells 20 to generate power therefrom has been executed, and when it is determined that the in-stop-mode power generating process has been executed, the time (Tsc) for the diluting process of diluting the concentration of the fuel gas in the anode with the scavenging apparatus 15 is set shorter than that in the case where it is determined that the in-stop-mode power generating process has not been executed. This makes it possible to reduce the energy loss of the fuel cell system 10 accordingly.

The disclosure is not limited to the foregoing embodiments, and may take various configurations based on the contents of the present specification.

According to the embodiments, there is provided a control method for a fuel cell system having a fuel cell that generates power according to an electrochemical reaction of an oxide gas supplied to a cathode side with a fuel gas supplied to an anode side, an oxide-gas supply apparatus that supplies the oxide gas to the fuel cell, a fuel-gas supply apparatus that supplies the fuel gas to the fuel cell, and a scavenging apparatus that executes a diluting process of diluting a concentration of the fuel gas in the anode of the fuel cell, and then supplies a scavenging gas into the anode for scavenging, when an outside temperature is equal to or lower than a predetermined temperature at a time of stopping an operation of the fuel cell.

The control method includes determining, upon detection of an instruction to stop the operation of the fuel cell, whether an in-stop-mode power generating process of stopping supply of the fuel gas, and supplying the oxide gas to the fuel cell to generate power therefrom has been executed, and shortening a time for the diluting process to be executed by the scavenging apparatus when it is determined that the in-stop-mode power generating process has been executed, as compared with a case where it is determined that the in-stop-mode power generating process has not been executed.

In the above control method, the longer an elapsed time till activation of the scavenging apparatus after the in-stop-mode power generating is, the shorter the time for the diluting process may be set.

With the method according to the embodiments, when the in-stop-mode power generating process is executed, the hydrogen concentration of the fuel gas drops. Therefore, the hydrogen diluting process (diluting process for making the concentration of hydrogen to be discharged to below a predetermined value before the hydrogen is discharged) on the anode side with the scavenging apparatus does not use much scavenging gas (dilution gas). When it is determined that the in-stop-mode power generating process has been executed, the time for generating the scavenging gas after power generation of the fuel cell system is stopped can be shortened by setting the time for the diluting process by the scavenging apparatus shorter as compared with the case where it is determined that the in-stop-mode power generating process has not been executed. This can shorten the drive time for driving the scavenging apparatus which is needed to generate the scavenging gas, thereby reducing the energy consumption after power generation of the fuel cell system is stopped.

Since the oxygen concentration on the cathode side is low after the in-stop-mode power generating process is stopped, the amount of oxygen transmitted to the anode is small, so that the hydrogen concentration on the anode side is reduced slowly. Because of the slow reduction in hydrogen concentration, the dilution time can be set short.

Shortening the dilution time can suppress the cathode side from becoming dry. The suppression of the dry state of the cathode prevents the IV (current-voltage) characteristic from dropping at the time of the next activation, thus improving the fuel consumption and the power performance. It is known that when the cathode side becomes too dry, the reaction is not accelerated, which reduces the cell voltage per the amount of unit current from the fuel cell (reduction in IV characteristic).

In case of scavenging the anode side after the in-stop-mode power generating process, the scavenging process is carried out with the amount of hydrogen on the anode side being reduced. Therefore, deterioration of the electrolyte membrane/electrode assembly which is caused by the scavenging-originated reaction of oxygen with hydrogen gas is reduced as compared with the case where the in-stop-mode power generating process is not executed.

In the control method, the diluting process may be executed together with a scavenging process for the cathode.

Because a small amount of the scavenging gas as a dilution gas is needed, the scavenging process for the anode can be executed at the same time as the scavenging process for the cathode, and the time for operating the fuel cell system after the operation of the fuel cell system is stopped (after an operation stopping switch (ignition switch) is set off) can be shortened. This can reduce uncomfortable feeling given to a user (awkward feeling caused by activation of the fuel cell system for scavenging after the operation of the fuel cell system is stopped), thus improving the merchantability.

It is to be noted that the process of supplying the scavenging gas into the anode to scavenge the anode after executing the diluting process of diluting the concentration of the fuel gas in the anode of the fuel cell when the outside temperature is equal to or lower than a predetermined temperature at the time of stopping the operation of the fuel cell blows off moisture from inside the anode to prevent the fuel cell from being frozen at a low temperature.

In the control method according to the embodiments, whether the in-stop-mode power generating process has been executed may be determined based on an anode pressure when power generation of the fuel cell is stopped.

In the control method according to the embodiments, whether the in-stop-mode power generating process has been executed may be determined based on an accumulated current value from the point of detecting the instruction to stop the operation of the fuel cell to the point of stopping power generation.

With the method according to the embodiments, the conditions for determining whether the in-stop-mode power generating process has been executed. When the in-stop-mode power generating process is executed, nitrogen spreads to the rear portion of a cathode pipe, so that the concentration of oxygen in the cathode becomes 0% for a long period of time. Therefore, whether the in-stop-mode power generating process has been executed can be grasped by the reduction in the oxygen concentration of the cathode. However, many fuel cell systems are not provided with a cathode oxygen sensor. Therefore, whether the in-stop-mode power generating process has been executed may be determined by detecting the anode pressure that is reduced by the in-stop-mode power generating process in which supply of the fuel gas is stopped, using the anode pressure sensor which is generally provided, or may be determined based on an accumulated current value which is generally calculated. This makes it possible to determine whether the in-stop-mode power generating process has been executed, without requiring an extra cost.

In this case, the state where the in-stop-mode power generating process is executed is when the decision on the anode pressure or the accumulated current value is satisfied. Interruption in the in-stop-mode power generating process in which those decisions are not satisfied is not said to be the in-stop-mode power generating process being executed. Practically, it is determined whether the in-stop-mode power generating process should be executed from the time at which the ignition switch is set off, or the in-stop-mode power generating process should be interrupted before being completed.

With the method according to the embodiments, in case of executing the scavenging process for scavenging the anode side with a scavenging gas (anode scavenging process) after stopping power generation of the fuel cell system when the outside temperature is equal to or lower than a predetermined low temperature during operation of the fuel cell system, it is determined whether the in-stop-mode power generating process of stopping supply of a fuel gas, and supplying an oxide gas to a fuel cell to generate power therefrom has been executed, and the time (dilution time) for a diluting process of diluting the concentration of the fuel gas in the anode with the scavenging apparatus is shortened when it is determined that the in-stop-mode power generating process has been executed, as compared with a case where it is determined that the in-stop-mode power generating process has not been executed.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system having a fuel cell to generate power according to an electrochemical reaction of an oxide gas supplied to a cathode side with a fuel gas supplied to an anode side, an oxide-gas supply apparatus to supply the oxide gas to the fuel cell, a fuel-gas supply apparatus to supply the fuel gas to the fuel cell, and a scavenging apparatus to execute a diluting process of diluting a concentration of the fuel gas in the anode of the fuel cell, the scavenging apparatus being configured to supply a scavenging gas into the anode for scavenging when an outside temperature is equal to or lower than a predetermined temperature at a time of stopping an operation of the fuel cell, the method comprising:

determining, if an instruction to stop the operation of the fuel cell is detected, whether an in-stop-mode power generating process, in which the fuel gas is no longer supplied and the oxide gas is supplied to the fuel cell to generate power from the oxide-gas supply apparatus, has been executed; and shortening a time for the diluting process to be executed by the scavenging apparatus when it is determined that the in-stop-mode power generating process has been executed, as compared with a case where it is determined that the in-stop-mode power generating process has not been executed.

2. The method according to claim 1, wherein the longer an elapsed time till activation of the scavenging apparatus after the in-stop-mode power generating is, the shorter the time for the diluting process is set.

3. The method according to claim 1, wherein the diluting process is executed together with a scavenging process for the cathode.

4. The method according to claim 1, wherein whether the in-stop-mode power generating process has been executed is determined based on an anode pressure when power generation of the fuel cell is stopped.

5. The method according to claim 1, wherein whether the in-stop-mode power generating process has been executed is determined based on an accumulated current value from a point of detecting the instruction to stop the operation of the fuel cell to a point of stopping the power generation of the fuel cell.

6. The method according to claim 1, wherein in the determining of the in-stop-mode power generating process, if a pressure on the anode side is lower than a threshold pressure, it is determined that the in-stop-mode power generating process has been executed, and in the determining of the in-stop-mode power generating process, if the pressure on the anode side is equal to or higher than the threshold pressure, it is determined that the in-stop-mode power generating process has not been executed.

7. The method according to claim 1, wherein the shortening of the time for the diluting process includes setting a first time as the time for the diluting process when it is determined that the in-stop-mode power generating process has been executed, and setting a second time as the time for the diluting process when it is determined that the in-stop-mode power generating process has not been executed, the first time being shorter than the second time.

* * * * *